US012793062B2

(12) United States Patent
Kommalapati et al.

(10) Patent No.: US 12,793,062 B2
(45) **Date of Patent: *Nov. 10, 2026**

(54) HYBRID BLOCKCHAIN NETWORK FOR DYNAMIC COMMUNICATION WITH EXTERNAL SYSTEMS

(71) Applicant: State Farm Mutual Automobile Insurance Company, Bloomington, IL (US)

(72) Inventors: Ved Kommalapati, Bloomington, IL (US); Jacob Braun, Oviedo, FL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/305,609

(22) Filed: Aug. 20, 2025

(65) Prior Publication Data

US 2025/0373456 A1 Dec. 4, 2025

Related U.S. Application Data

(63) Continuation of application No. 18/523,493, filed on Nov. 29, 2023, now Pat. No. 12,417,454.

(51) Int. Cl.
*G06Q 20/38* (2012.01)
*G06F 16/13* (2019.01)
(Continued)

(52) U.S. Cl.
CPC ........... *G06Q 20/389* (2013.01); *G06Q 20/10* (2013.01); *G06Q 20/3825* (2013.01);
(Continued)

(58) Field of Classification Search
CPC .. G06Q 20/389; G06Q 20/10; G06Q 20/3825; G06Q 20/3827; G06Q 20/3829;
(Continued)

(56) References Cited

U.S. PATENT DOCUMENTS

2016/0357550 A1* 12/2016 Thomas .................... G06F 8/61
2017/0287068 A1* 10/2017 Nugent .................. G06Q 20/08
(Continued)

FOREIGN PATENT DOCUMENTS

WO WO-2023034791 A1 * 3/2023 ............. G06Q 40/02

OTHER PUBLICATIONS

"The Dawn of Insurtech", Jan. 26, 2018, 16 pages (Year: 2018).*
(Continued)

*Primary Examiner* — James D Nigh
(74) *Attorney, Agent, or Firm* — Lee & Hayes, P.C.

(57) ABSTRACT

This disclosure describes techniques for using a blockchain network to dynamically generate and transmit communications based on data stored on distributed records. The techniques described herein may enable an automated routine to store anonymized data on a distributed record and use such ledger data to determine whether and/or how to communicate with account holders. This enables the automated routine to avoid the need to decrypt data stored on distributed records before performing computations using the ledger data. Moreover, the techniques described herein enable an automated routine to use data stored on a public distributed record as a retrieval key for accessing a private backend database. This enables the automated routine to avoid the need to perform computationally resource-intensive operations to retrieve and/or interpret backend data beyond data queries. Accordingly, various aspects of the techniques described herein improve the computational efficiency of performing blockchain-based dynamic communication.

20 Claims, 5 Drawing Sheets

(51) Int. Cl.

| | |
|---|---|
| ***G06Q 20/06*** | (2012.01) |
| ***G06Q 20/10*** | (2012.01) |
| ***G06Q 40/08*** | (2012.01) |
| ***H04L 9/00*** | (2022.01) |
| ***H04L 9/08*** | (2006.01) |
| ***H04L 9/32*** | (2006.01) |

(52) U.S. Cl.
CPC ..... *G06Q 20/3827* (2013.01); *G06Q 20/3829* (2013.01); *H04L 9/0825* (2013.01); *H04L 9/3247* (2013.01); *G06F 16/137* (2019.01); *H04L 9/50* (2022.05)

(58) Field of Classification Search
CPC .. G06Q 20/065; G06Q 20/102; G06Q 40/084; G06Q 2220/00; H04L 9/0825; H04L 9/3239; H04L 9/3247; H04L 9/50; H04L 2209/56; G06F 16/137
USPC .......................................................... 713/176
See application file for complete search history.

(56) References Cited

U.S. PATENT DOCUMENTS

| | | | | |
|---|---|---|---|---|
| 2023/0019639 | A1* | 1/2023 | Vijayaraghavan ..... | G06Q 30/06 |
| 2023/0353575 | A1* | 11/2023 | Chandra .............. | G06Q 20/206 |

OTHER PUBLICATIONS

"Discussion Paper on Blockchain and Smart Contracts in Insurance", European Insurance and Occupational Pensions Authority, Apr. 29, 2021, 38 pages (Year: 2021).*
Breidenbach et al. "Chainlink Off-chain Reporting Protocol", Feb. 24, 2021, 25 pages (Year: 2021).*
Sedkaoui et al. "Blockchain-based smart contract technology application in the insurance industry: The case of 'Fizzy'", Mar. 13, 2022, 24 pages (Year: 2022).*
Breidenbach et al. "Chainlink Off-chain Reporting Protocol", Feb. 24, 2021, 25 pages (Year: 2021) 25 pages.
The Dawn of Insurtech, Jan. 26, 2018, 16 pages (Year: 2018) 16 pages.
Discussion Paper on Blockchain and Smart Contracts in Insurance, European Insurance and Occupational Pensions Authority, Apr. 29, 2021, 38 pages (Year: 2021) 38 pages.
Ethermail, "Reimagining Email for Web3." downloaded from https://ethermail.io/ on Nov. 29, 2023, 11 pages.
Sedkaoui et al. "Blockchain-based smart contract technology application in the insurance industry: The case of 'Fizzy'", Mar. 13, 2022, 24 pages (Year: 2022), 24 pages.
Skiff, "Privacy-first end-to-end encrypted email," downloaded from https://skiff.com/ on Nov. 29, 2023, 9 pages.
Skiff, "Using an Ethereum wallet for email," downloaded from https://skiff.com/blog/ethereum-wallet-email on Nov. 29, 2023, 11 pages.

* cited by examiner

HYBRID BLOCKCHAIN NETWORK FOR DYNAMIC COMMUNICATION WITH EXTERNAL SYSTEMS

RELATED APPLICATIONS

This application is a continuation of and claims priority to U.S. patent application Ser. No. 18/523,493, filed Nov. 29, 2023, the entirety of which is claimed herewith.

TECHNICAL FIELD

The present disclosure relates to blockchain-based computer storage systems, and more particularly to techniques for data retrieval and storage on distributed records.

BACKGROUND

Many industries rely on centralized databases to store critical records and data. However, centralized databases have several limitations when it comes to data redundancy, transparency, and access speed. For example, centralized databases are more prone to data loss because it is harder to create a larger number of redundant database versions given a set of centralized database nodes. As another example, retrieval of data from a centralized database may be hampered if the centralized database and/or a network used to communicate with the centralized database suffers from performance issues. As another example, centralized databases may suffer from transparency issues resulting from a lack of direct access by external systems to the underlying data stored by the database.

In response, some solutions use blockchain technology to improve data redundancy, transparency, and access speed. However, there is a technical challenge associated with how to store data on a blockchain network to increase blockchain usage, reduce vulnerabilities associated with decentralized and/or public access to database ledgers, and reduce computational overheads associated with cryptographical operations. There is a need for techniques that use blockchain networks and non-blockchain storage mediums to balance security, transparency, and efficiency objectives.

Examples of the techniques described in the present disclosure are directed to overcoming the challenges and needs described above.

SUMMARY

In some examples, the techniques described herein relate to a computer-implemented method, including receiving, by a processor, a first event notification, wherein the first event notification is generated by a periodic trigger system based on detecting that a periodic condition is satisfied. The method further includes, based on receiving the first event notification, executing, by the processor, an automated routine characterized by a first condition. The automated routine is configured to access a first distributed record and a second distributed record, wherein the first distributed record represents a first value and a first communication account, and wherein the second distributed record represents a second value and a second communication account. The smart contract is further configured to determine that the first value satisfies the first condition. The automated routine is further configured to, based on determining that the first value satisfies the first condition, select a first communication template. The automated routine is further configured to determine a first communication based on the first communication template and the first value. The automated routine is further configured to, subsequent to determining the first communication, transmit the first communication to the first communication account. The automated routine is further configured to determine that the second value fails to satisfy the first condition. The automated routine is further configured to, based on determining that the second value fails to satisfy the first condition, select a second communication template. The automated routine is further configured to determine a second communication based on the second communication template and the second value. The automated routine is further configured to, subsequent to determining the second communication, transmit the second communication to the second communication account.

In additional examples, the techniques described herein relate to a computing system, including: a processor; and memory storing computer-executable instructions that, when executed by the processor, cause the computing system to perform operations including receiving a first event notification, wherein the first event notification is generated by a periodic trigger system based on detecting that a periodic condition is satisfied. The method further includes, based on receiving the first event notification, executing an automated routine characterized by a first condition. The automated routine is configured to access a first distributed record and a second distributed record, wherein the first distributed record represents a first value and a first communication account, and wherein the second distributed record represents a second value and a second communication account. The smart contract is further configured to determine that the first value satisfies the first condition. The automated routine is further configured to, based on determining that the first value satisfies the first condition, select a first communication template. The automated routine is further configured to determine a first communication based on the first communication template and the first value. The automated routine is further configured to, subsequent to determining the first communication, transmit the first communication to the first communication account. The automated routine is further configured to determine that the second value fails to satisfy the first condition. The automated routine is further configured to, based on determining that the second value fails to satisfy the first condition, select a second communication template. The automated routine is further configured to determine a second communication based on the second communication template and the second value. The automated routine is further configured to, subsequent to determining the second communication, transmit the second communication to the second communication account.

In further examples, the techniques described herein relate to one or more non-transitory computer-readable media storing computer-executable instructions that, when executed by the processor, cause the one or more processors to perform operations, including receiving a first event notification, wherein the first event notification is generated by a periodic trigger system based on detecting that a periodic condition is satisfied. The method further includes, based on receiving the first event notification, executing an automated routine characterized by a first condition. The automated routine is configured to access a first distributed record and a second distributed record, wherein the first distributed record represents a first value and a first communication account, and wherein the second distributed record represents a second value and a second communication account. The smart contract is further configured to determine that the first value satisfies the first condition. The automated routine is further configured to, based on determining that the first value satisfies the first condition, select a first communication template. The automated routine is further configured to determine a first communication based on the first communication template and the first value. The automated routine is further configured to, subsequent to determining the first communication, transmit the first communication to the first communication account. The automated routine is further configured to determine that the second value fails to satisfy the first condition. The automated routine is further configured to, based on determining that the second value fails to satisfy the first condition, select a second communication template. The automated routine is further configured to determine a second communication based on the second communication template and the second value. The automated routine is further configured to, subsequent to determining the second communication, transmit the second communication to the second communication account.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for using a blockchain network to dynamically generate and transmit communications based on data stored on blockchain ledgers. The techniques described herein may enable a smart contract routine to store anonymized data on a blockchain ledger and use such ledger data to determine whether and/or how to communicate with account holders. This enables the smart contract routine to avoid the need to decrypt data stored on blockchain ledgers before performing computations using the ledger data. Moreover, the techniques described herein enable a smart contract routine to use data stored on a public blockchain ledger as a retrieval key for accessing a private backend database. This enables the smart contract routine to avoid the need to perform computationally resource-intensive operations to retrieve and/or interpret backend data beyond data queries. Accordingly, various aspects of the techniques described herein improve the computational efficiency and reliability of performing blockchain-based dynamic communication.

Figure 1:
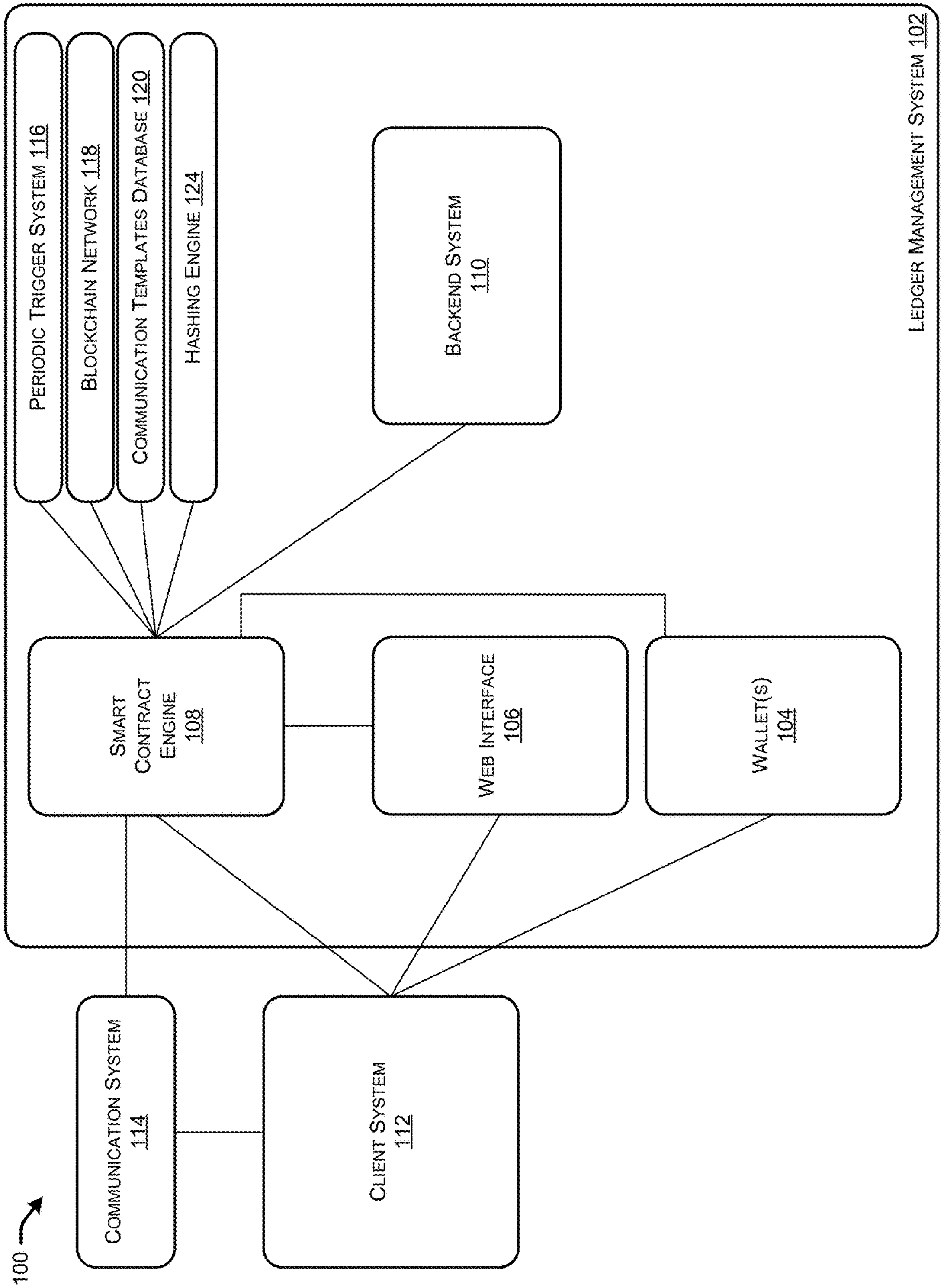
FIG. 1 depicts an example environment for dynamically generating communications based on data stored on a public ledger framework.

FIG. 1 depicts an example environment 100 for dynamically generating communications based on data stored on a public ledger framework. The environment 100 may enable a ledger management system 102 to determine parameters for the generation and/or transmission of a communication (e.g., an email notification) to a client system 112 based on data stored on a publicly accessible ledger and without the need to perform any cryptographic operations and/or operations configured to transmit a private key. Accordingly, environment 100 may enable the execution of various blockchain-related operations with enhanced system security and data integrity safeguards.

As depicted in FIG. 1, environment 100 includes, in addition to the ledger management system 102, a client system 112, and a communication system 114. The client system 112 may enable a user (e.g., an individual or an entity) to communicate with the ledger management system 102. For example, the client system 112 may include a personal computer device, a laptop device, and/or a mobile device that may enable the user to access the ledger management system (e.g., via the web interface 106 and/or by making an application programming interface (API) call to an API associated with the smart contract engine 108). In some cases, client system 112 enables the user to interact with the ledger management system 102 using a web browser application and/or a native smartphone application that is executed on the client system 112.

The communication system 114 may enable the ledger management system 102 to transmit communication(s) to one or more communication accounts (e.g., email accounts). For example, the communication system 114 may enable the ledger management system 102 to transmit email communications using one or more email protocols, such as one or more of the Simple Mail Transfer Protocol (SMTP), the Post Office Protocol (POP), or the Internet Message Access Protocol (IMAP). The communication system 114 may, in some cases, include an email server.

The ledger management system 102 may be configured to periodically: (i) determine a communication for transmission to each registered account associated with the ledger management system 102, and (ii) transmit each determined communication to the communication account associated with the corresponding registered account. Each registered account (e.g., each account registered on the ledger management system 102) may be associated with at least one of a cryptocurrency wallet or a blockchain ledger, such as a publicly accessible blockchain ledger.

As depicted in FIG. 1, the ledger management system 102 includes a set of wallets 104, a web interface 106, a smart contract engine 108, a backend system 110, a periodic trigger system 116, a blockchain network 118, a communication templates database 120, and a hashing engine 124. Wallets 104 may enable the ledger management system 102 to store cryptocurrencies associated with one or more registered accounts.

In some cases, each wallet is associated with at least one of a private key, a public key, or a wallet address. The private key may be a secret code (e.g., a secret alphanumeric code) that may be used to access and control cryptocurrencies stored on the wallet. For example, the private key may be used to sign a transaction that the transfer cryptocurrency originates from the wallet (e.g., to provide a mathematical proof that the transaction originates from an authorized owner of the wallet). The public key may be a code (e.g., an alphanumeric code, such as an alphanumeric code derived from the private key) that may be used to send cryptocurrencies to the wallet. For example, the public key may be generated by applying a one-way hash transformation to the private key. The wallet address may be a hashed version of the public key and may be used as a unique address for transactions that transfer cryptocurrency into a wallet.

In some cases, after updating a data field (e.g., a coverage amount) associated with a blockchain ledger, a smart contract routine may request a transfer of cryptocurrency funds corresponding to the updated data field to a wallet associated with the ledger. For example, the smart contract routine may be configured to process an insurance claim by validating claim details against data stored on the blockchain ledger. Upon validating the claim, the smart contract routine may update the coverage amount data field on the ledger to reflect the claim payout amount. The smart contract routine may then determine a wallet address stored on the ledger that is associated with the insurance policy. The smart contract routine may request an application programming interface (API) to transfer cryptocurrency funds equal to the claim payout amount from a wallet owned by the insurance provider to the wallet associated with the ledger. This may enable automated transferring of the claim payout upon the smart contract routine processing and approving the claim based on the conditions encoded in its logic. In some cases, the transfer request may be signed using a public key associated with the recipient blockchain wallet.

The web interface 106 may enable the client system 112 to retrieve data from and/or provide data to the smart contract engine 108. For example, the web interface 106 may be a server associated with a web application (e.g., a browser-based application and/or a native application) that is being executed on the client system 112 to enable the user(s) to request and cause execution of operations associated with one or more web services associated with the ledger management system 102.

Examples of web services that may be requested and/or delivered using the web interface 106 include displaying data associated with a user's wallet and/or a user's ledger. For example, the web interface 106 may enable the client system 112 to communicate with the ledger management system 102 to view account balances associated with wallets 104, view transaction histories associated with wallets 104, view and/or modify data (e.g., payment balances, coverage amounts, and/or communication account addresses) stored on the blockchain ledgers associated with the blockchain network 118), perform operations configured to transfer cryptocurrency from and/or to the wallets 104, and/or the like.

The smart contract engine 108 may be configured to execute operations associated with one or more smart contract routines. A smart contract routine may be a set of computer-implemented operations that executes a set of blockchain operations when the routine determines that one or more conditions are satisfied. Examples of blockchain operations include operations configured to transfer cryptocurrency funds from and/or to wallets 104, operations configured to view and/or modify data stored on the blockchain ledgers associated with the blockchain network 118, operations configured to generate and/or transmit one or more communications based on data associated with wallets 104 and/or data stored on the blockchain ledgers, and/or the like.

For example, a smart contract may be configured to, when triggered, determine whether an account balance value associated with a blockchain ledger exceeds zero. If the account balance value associated with the blockchain ledger exceeds zero, the smart contract may be configured to: (i) add a premium amount to the account balance value associated with the ledger, (ii) generate a communication describing that a respective account holder has not paid the full outstanding premium, and (iii) transmit the communication to a communication account associated with the account holder. If the account balance value associated with the blockchain ledger equals zero, the smart contract may be configured to: (i) add a premium amount to a coverage amount value associated with the ledger, (ii) generate a communication describing that a respective account holder has paid the full outstanding premium, (iii) transmit the communication to a communication account associated with the account holder, and (iv) add the premium amount to the account balance value associated with the ledger. As this example illustrates, the smart contract condition associated with a smart contract may be based on whether an account balance value exceeds zero.

As another example, a smart contract may be configured to, when triggered, determine whether a blockchain ledger associated with an escrow transaction indicates that all parties to the transaction have provided signed authorizations. If the blockchain ledger indicates that that all parties to the transaction have provided signed authorizations, the smart contract may be configured to: (i) transfer funds from a wallet associated with the escrow transaction to a wallet associated with a recipient party, (ii) generate a communication describing that the transfer of the escrow funds has been successfully completed, and (iii) transmit the communications to a list of email addresses associated with the blockchain ledger. If the blockchain ledger indicates that at least one party to the transaction has not provided a signed authorization, the smart contract may be configured to: (i) generate a communication describing that the transfer of the escrow funds has not been successfully completed, and (iii) transmit the communications to a list of email addresses associated with the blockchain ledger. As this example illustrates, the smart contract condition associated with a smart contract may be based on whether signed authorizations have been received from one or more parties associated with a transaction.

As an additional example, a smart contract may be configured to, when triggered, determine whether a blockchain ledger indicates that a condition associated with an insurance payout has been satisfied (e.g., whether an accident is recorded for a vehicle that is subject to body insurance). If the blockchain ledger indicates that the insurance payout condition has been satisfied, the smart contract may be configured to: (i) transmit an insurance coverage amount to a wallet associated with a corresponding policy holder, (ii) generate a communication describing that the insurance payout has been completed, and (iii) transmit the communication to a communication account associated with the policy holder. If the blockchain ledger indicates that the insurance payout condition has not been satisfied, the smart contract may be configured to: (i) generate a communication describing that the insurance payout has not been completed, and (ii) transmit the communication to a communication account associated with the policy holder. As this example illustrates, the smart contract condition associated with a smart contract may be based on whether an insurance payout condition has been satisfied.

As these examples illustrate, in some cases, a smart contract routine may be characterized by at least one of a trigger and a condition. The trigger may define one or more conditions whose satisfaction leads to triggering and/or activation of the operations associated with the smart. The conditions may define one or more conditions whose satisfaction or lack of satisfaction affects the set of operations performed by the smart contract. Accordingly, the trigger may define a prerequisite state of the smart contract operations, while the condition may define an internal state for the smart contract operations.

In some cases, the smart contract routine is an example of an automated routine that may be performed by the ledger management system 102. An automated routine may, in the context of a blockchain-related system, refer to a set of computer-implemented operations that are executed automatically based on predetermined conditions being satisfied by a database ledger (and/or other distributed record maintained by a blockchain-related system). For instance, a smart contract routine may include code that is stored on a blockchain ledger and that self-executes when certain conditions defined in the smart contract are fulfilled. By automating routines like transfers, payments, and other ledger-based operations in a smart contract, the ledger management system 102 may be able to create trust, reduce reliance on manual interventions, and increase efficiency in the management of ledger-based transactions. Other examples of automated routines include automatically redistributing assets to beneficiaries upon an account holder's passing or automatically releasing escrowed funds to a seller once an item is confirmed as delivered. By codifying business logic into smart contract routines, the ledger management system 102 may enable complex operations to be performed on the blockchain in a transparent and automated manner. Accordingly, in some cases, all of the operations described herein as being performed with respect to a smart contract routine may be performed with respect to any other type of an automated routine too.

In some cases, a blockchain ledger is an example of a distributed record. A distributed record, in the context of a blockchain-related system, may refer to a set of data fields stored on two or more different computing devices in a network. For example, a distributed record may include a number of cryptographically linked blocks, with each block storing multiple data entries. The blocks may be stored in a distributed manner and across various nodes in a peer-to-peer blockchain network, with each node maintaining a copy of the record. This storage arrangement may lead to redundancy as well as consensus, as changes to the blockchain ledger must be validated and accepted by a majority of nodes. In some cases, the decentralized and distributed nature of blockchain ledgers make them highly resilient to outages or manipulation, since there is no single point of failure. Other examples of distributed records enabled by blockchain include decentralized identity records, supply chain tracking records, distributed file storage records, and non-fungible token (NFT) records. Accordingly, in some cases, all of the operations described herein as being performed with respect to a blockchain ledger may be performed with respect to any other type of a distributed record too.

In some cases, a cryptocurrency wallet is an example of a distributed account. A distributed account may be a digital identity on a distributed network that can hold funds and/or values, and/or interact with decentralized applications. A distributed account may enable users to receive, store, and transfer content (e.g., content representing cryptocurrency values) on a blockchain ledger. In some cases, distributed accounts more broadly represent user identities that can execute transactions and/or be assigned access permissions on a distributed network. For example, a distributed account may represent an identity in a decentralized authentication system (e.g., to represent one or more attestations and/or one or more claims about the account owner). Accordingly, in some cases, all of the operations described herein as being performed with respect to a wallet may be performed with respect to any other type of a distributed account too.

The backend system 110 may be configured to store non-ledger data used by the smart contract engine 108 to perform smart contract operations. For example, the backend system 110 may include a database (e.g., a relational database, an unstructured database, a graph-based database, an object-oriented database, and/or the like) that stores data used by the smart contract engine 108 to perform smart contract operations.

In some cases, the smart contract engine 108 may be configured to perform operations associated with a smart contract based on: (i) data stored on the blockchain ledgers associated with the blockchain network 118, and (ii) data stored on the database(s) associated with the backend system 110. For example, a smart contract may use a hashed email address stored on a blockchain ledger as a retrieval key to retrieve, from a database associated with the backend system 110, an un-hashed email address and use the un-hashed email address to transmit one or more communications to. As another example, a smart contract may use a unique identifier stored on a blockchain ledger as a retrieval key to retrieve, from a database associated with the backend system 110, an email address and use the email address to transmit one or more communications. As an additional example, a smart contract may use a hashed wallet identifier stored on a blockchain ledger as a retrieval key to retrieve, from a database associated with the backend system 110, an un-hashed wallet identifier and use the un-hashed wallet identifier to transmit cryptocurrency funds to the corresponding wallet.

In some cases, the backend system 110 stores data describing whether a registered account has satisfied one or more conditions (e.g., log data corresponding to one or more events, such as one or more payments, associated with the registered account). For example, the backend system 110 may store a log indicating dates and times when a registered account holder has made a premium payment. The smart contract engine 108 may be configured to query the backend system 110 to retrieve the payment log data for a particular registered account. The smart contract engine 108 may then execute operations of a smart contract routine configured to process the payment log data and determine whether the registered account has satisfied a condition, such as making at least a threshold number of payments within a defined time period. Based on the determination of whether the condition has been satisfied, the smart contract routine may perform further operations, such as retrieving a communication template from the communication templates database 120, generating a communication by integrating dynamic data into the template, and transmitting the communication to a communication account associated with the registered account.

In some cases, the backend system 110 may store log data describing communications transmitted based on actions of the smart contract engine 108. For example, after the smart contract engine 108 generates and transmits a communication to a registered account holder based on operations of a smart contract routine, the smart contract engine 108 may send a notification to the backend system 110. The notification may include details such as the registered account identifier, the communication template used, values of dynamic fields inserted into the template, date/time of transmission, recipient address, and/or the like. The backend system 110 may update a communication log to record this transmission event. This may provide an audit trail that can be used to verify that appropriate communications have been sent for registered accounts when specific conditions encoded in smart contract logic are triggered. The communication log data may also be utilized for other purposes such as analytics, reporting, and/or optimization of communication strategies.

As depicted in FIG. 1, the smart contract engine 108 may communicate with a periodic trigger system 116. The periodic trigger system 116 may be configured to provide an event notification to the smart contract engine 108 that causes the smart contract engine 108 to perform operations associated with at least one smart contract. For example, the periodic trigger system 116 may execute operations associated with a blockchain oracle routine. A blockchain oracle routine may be configured to provide an event notification based on an event detected based on a database that is external to the ledger management system 102 and/or reported by a software application that is executed outside the ledger management system 102. An example of a blockchain oracle routine is a routine that queries an external time-reporting application (e.g., a clock application and/or a calendar application) to determine that a periodic condition has been satisfied and, in response, determine an event notification and provide the event notification to the smart contract engine 108. For example, the blockchain oracle routine may provide an event notification to the smart contract engine 108 on the first day of each month.

In some cases, the periodic trigger system 116 may provide different sets of event notifications each associated with a different periodicity arrangement, where a periodicity arrangement may be characterized by how often an event notification is provided and at what point during a relevant period the event notification is provided. For example, a first set of event notifications may be provided every month at the beginning of the month, a second set of event notifications may be provided every month at the $15^{th}$ day of the month, a third set of event notifications may be provided every month at the midpoint of the month, a fourth set of event notifications may be provided every month at the final Wednesday of the month, a fifth set of event notifications may be provided every week on Monday, and a sixth set of event notifications may be provided every day at 8 AM. In some cases, each set of event notifications is configured to trigger operations of a corresponding set of smart contract routines. For example, a first set of smart contract routines may be triggered every month at the beginning of the month, while a second set of smart contract routines may be triggered every month on the $15^{th}$ day of the month.

In some cases, the periodic trigger system 116 may be configured to provide an event notification to the smart contract engine 108 at the beginning of each month and another event notification to the smart contract engine 108 on the $15^{th}$ day of each month. In some cases, the former event notification is configured to trigger a smart contract routine that, when triggered, transmits custom communications to registered account holders indicating whether the corresponding accounts are associated with outstanding payments. In some cases, the latter event notification is configured to trigger a smart contract routine that, when triggered, transmits custom communications to registered account holders indicating the account balance values associated with those account holders in anticipation of an upcoming payment deadline.

The blockchain network 118 may be configured to store one or more blockchain ledgers. A blockchain ledger may include one or more data fields, such as one or more data fields stored using a set of cryptographically linked blocks. The blockchain network 118 may store the blockchain ledgers redundantly across one or more computing nodes, rather than on a centralized storage location. Updates to one copy of the blockchain ledgers may be distributed to other copies via one or more synchronization operations.

A blockchain ledger stored on blockchain network 118 may store one or more data fields that may be used by a smart contract routine to determine whether a condition associated with the routine has been satisfied. For example, a blockchain ledger may store an account balance value, and a condition associated with a smart contract routine may be characterized by a threshold value for the account balance value. As another example, a blockchain ledger may store whether an event is recorded to have occurred, and a condition associated with a smart contract routine may be characterized by a condition defined by the occurrence of the corresponding event.

In some cases, a blockchain ledger stored on blockchain network 118 stores: (i) a set of numeric values (e.g., an account balance value and/or a coverage amount value) associated with a corresponding registered account, and (ii) an identifier of a communication account (e.g., a hashed identifier and/or an un-hashed identifier of a communication account, such as a hashed email address and/or an un-hashed email address) associated with the corresponding registered account.

For example, a blockchain ledger stored on blockchain network 118 may store: (i) an account balance value associated with a corresponding registered account, (ii) a coverage amount value associated with the corresponding registered account, and (iii) an identifier of a communication account associated with the corresponding registered account. In some cases, when triggered (e.g., when triggered periodically and based on an event notification provided to the smart contract engine 108 by the periodic trigger system 116), the smart contract engine 108 may execute operations of a smart contract routine that is configured to: (i) retrieve a blockchain ledger (e.g., retrieve each blockchain ledger in a sequential or parallelized manner); (ii) determine whether the account balance value associated with the retrieved ledger satisfies a threshold condition (e.g., exceeds zero); (iii) if the account balance value associated with the retrieved ledger fails to satisfy the threshold condition: (a) increase the account balance value by a predefined amount (e.g., by a premium amount) but refrain from updating the coverage amount value, (b) generate a communication indicating successful payment of the premium and/or an account balance of zero, (c) transmit the communication to a communication account determined based on the identifier, and (d) increase the account balance value by a predefined amount (e.g., by a premium amount); and (iv) if the account balance value associated with the retrieved ledger fails to satisfy the threshold condition: (a) generate a communication indicating lack of successful payment of the premium and/or an account balance exceeding zero, (b) transmit the communication to a communication account determined based on the identifier, and (c) increase the account balance value by a predefined amount (e.g., by a premium amount).

As another example, a blockchain ledger stored on blockchain network 118 may store: (i) an account balance value associated with a corresponding registered account, (ii) a coverage amount value associated with the corresponding registered account, and (iii) a hashed identifier of a communication account associated with the corresponding registered account. In some cases, when triggered (e.g., when triggered periodically and based on an event notification provided to the smart contract engine 108 by the periodic trigger system 116), the smart contract engine 108 may execute operations of a smart contract routine that is configured to: (i) retrieve a blockchain ledger (e.g., retrieve each blockchain ledger in a sequential or parallelized manner); (ii) determine whether the account balance value associated with the retrieved ledger satisfies a threshold condition (e.g., exceeds zero); (iii) if the account balance value associated with the retrieved ledger fails to satisfy the threshold condition: (a) increase the account balance value by a predefined amount (e.g., by a premium amount), (b) generate a communication indicating successful payment of the premium and/or an account balance of zero, (c) use the hashed identifier as a retrieval key to retrieve a corresponding un-hashed communication account from the backend system 110, (d) transmit the communication to the un-hashed communication account determined based on the identifier, and (e) increase the account balance value by a predefined amount (e.g., by a premium amount); and (iv) if the account balance value associated with the retrieved ledger fails to satisfy the threshold condition: (a) generate a communication indicating lack of successful payment of the premium and/or an account balance exceeding zero, (b) use the hashed identifier as a retrieval key to retrieve a corresponding un-hashed communication account from the backend system 110, (c) transmit the communication to the un-hashed communication account determined based on the identifier, and (d) increase the account balance value by a predefined amount (e.g., by a premium amount).

As further depicted in FIG. 1, the ledger management system 102 stores a set of communication templates on a communication templates database 120. The communication templates database 120 may be used by the smart contract engine 108 to generate communications for transmission to communication accounts associated with registered accounts. In some cases, a smart contract routine may be configured to select one of a set of communication templates based on whether data associated with a ledger satisfies a condition. The selected communication template may include static content (e.g., static text segments) as well as one or more parameters that are determined based on data associated with the ledger.

For example, a smart contract routine configured to notify account holders about successful premium payments may be associated with static text data describing successful premium payments as well as dynamic fields corresponding to account holder names, payment amounts, payment dates, account numbers, and/or the like. In some cases, the smart contract routine may be configured to: (i) determine that a registered account is associated with successful payment, (ii) update the blockchain ledger associated with the registered account to reflect the successful payment (e.g., by updating the account balance value and/or the coverage amount value), (iii) retrieve a communication template associated with successful premium payments, (iv) determine one or more dynamic field values corresponding to one or more dynamic fields of the communicate template based on data associated with the registered account (e.g., data stored on the corresponding blockchain ledger and/or on the backend system 110), (v) generate a communication by integrating the dynamic field values into the communicate template, and (vi) transmit the generated communication to a communication account associated with the registered account (e.g., a communication account determined by querying the backend system 110 based on a retrieval key determined based on the blockchain ledger data).

As another example, a smart contract routine configured to notify account holders about unsuccessful premium payments may be associated with static text data describing unsuccessful premium payments as well as dynamic fields corresponding to account holder names, payment amounts, payment dates, account numbers, and/or the like. In some cases, the smart contract routine may be configured to: (i) determine that a registered account is associated with an unsuccessful payment, (ii) update the blockchain ledger associated with the registered account to reflect the unsuccessful payment (e.g., by updating the account balance value and/or the coverage amount value), (iii) retrieve a communication template associated with unsuccessful premium payments, (iv) determine one or more dynamic field values corresponding to one or more dynamic fields of the communicate template based on data associated with the registered account (e.g., data stored on the corresponding blockchain ledger and/or on the backend system 110), (v) generate a communication by integrating the dynamic field values into the communicate template, and (vi) transmit the generated communication to a communication account associated with the registered account (e.g., a communication account determined by querying the backend system 110 based on a retrieval key determined based on the blockchain ledger data).

In some cases, the communication templates stored on the communication templates database 120 may be replaced by new communication templates. In some cases, such replacements need to be performed by an authorized user and/or via requests that include valid digital signatures. For example, an administrator associated with the ledger management system 102 may use the client system 112 to access an administrative interface of the web interface 106. The administrator may provide credentials to authenticate their identity and upload a new communication template, specifying which existing template it should replace. The web interface 106 may validate the administrator's credentials and the integrity of the new template file. Upon successful validation, the web interface 106 may store the new template in the communication templates database 120, replacing the specified existing template. This may enable the content and structure of communication templates to be updated in a controlled manner by authorized personnel. In some cases, template replacement operations may be recorded (e.g., on the backend system 110) in an activity log to maintain an audit trail.

In some cases, while the backend system 110 is a centralized storage framework (e.g., a centralized storage framework that is not publicly accessible), the blockchain network 118 is a decentralized storage framework (e.g., a decentralized storage framework that is publicly accessible). For example, the backend system 110 may include databases and/or servers that are privately operated within the ledger management system 102 and are not exposed externally, while the blockchain network 118 may enable public access to the blockchain ledgers. In some cases, external nodes may participate in the blockchain network 118 to maintain a decentralized ledger replication and consensus process, while the data in the backend system 110 may serve as internal system configuration data. In some cases, by combining both centralized and decentralized storage frameworks, the overall system may enable transparency for user data and security for system configuration data.

For example, the backend system 110 may include one or more centralized servers and/or databases operated by the entity associated with the ledger management system 102. Meanwhile, the blockchain network 118 may include a distributed network of nodes with copies of blockchain ledgers distributed across many devices not centrally managed. This may be because, while the decentralized nature of the blockchain network 118 enhances immutability, integrity, and/or public accessibility of the stored ledger data, the backend system 110 provides centralized, scalable storage and retrieval of supplemental non-ledger data. Accordingly, blockchain network 118 may ensure that the core account balance, event log, and/or communication identifier data remain decentralized and independently verifiable through the underlying blockchain consensus mechanisms.

As further depicted in FIG. 1, the ledger management system 102 includes a hashing engine 124 that is configured to process a data field provided by the smart contract engine 108 (e.g., a communication account field) and apply a hash function (e.g., a one-way hash function) to the data field to generate a hashed data field (e.g., a hashed communication account). The hashed value may then be stored on a blockchain ledger stored on the blockchain network 118. In some cases, subsequent to storing a hashed data field (e.g., a hashed communication account) on a blockchain ledger, the smart contract engine 108 stores the corresponding un-hashed data field (e.g., an un-hashed communication account) on the backend system 110 (e.g., in association with the hashed data field, such as by using the hashed data field as the retrieval key and/or the primary key for storing and/or retrieval of the un-hashed data field). For example, the smart contract engine 108 may store a hashed communication account on a corresponding blockchain ledger and then store the corresponding un-hashed communication account on the backend system 110, where the backend system 110 may represent that the un-hashed communication account and the hashed communication account are related.

Accordingly, various components of environment 100 enable dynamically generating communications based on data stored on a public ledger framework and without the need to perform any cryptographic operations and/or operations configured to transmit a private key. For example, the smart contract engine 108 may be configured to, based on (e.g., in response to) receiving an event notification from the periodic trigger system 116: (i) retrieve a blockchain ledger from the blockchain network 118, (ii) determine (e.g., based on log data retrieved from the backend system 110) whether the blockchain ledger satisfies a condition associated with a triggered smart contract routine, (iii) updating one or more values associated with the retrieved ledger based on whether the condition is satisfied, (iv) selecting a communication template from the communication templates database 120 based on whether the condition is satisfied, (v) generate a communication based on the selected communication template, and (vi) transmit, using the communication system 114, the communication to a communication account associated with the blockchain ledger. The blockchain ledger may have a field that represents data associated with a communication account. For example, the blockchain ledger may include a value that represents a hashed version of the communication account. The blockchain ledger may use the hashed communication account to query the backend system 110 for an un-hashed communication account associated with the hashed communication account and use the un-hashed communication account as the target address for the transmission of the communication. Accordingly, the smart contract engine 108 may retrieve the un-hashed communication account through a targeted query and without performing any cryptographic operations configured to decode a hashed value.

In some cases, the techniques described herein improve the computational efficiency of using a publicly accessible blockchain network to perform dynamic communications. For example, in some cases, a smart contract routine may use data accessible on public blockchain ledgers to perform computations needed to determine whether and/or how to communicate with an account and limit operations with non-blockchain storage systems to retrieval of data such as communication accounts. This enables the smart contract routine to avoid having to perform any cryptographic operations often associated with the decoding of sensitive data stored on blockchain ledgers. By reducing computationally expensive and resource-intensive operations associated with cryptographically decoding ledger data, the techniques described herein may improve the computational efficiency of using a publicly accessible blockchain network to perform dynamic communications.

In some cases, the techniques described herein improve the speed and/or reliability of performing dynamic communications. As described above, in some cases, the techniques described herein enable a smart contract routine to heavily rely on data accessible on blockchain ledgers to perform computations needed to determine whether and/or how to communicate with an account and limit operations with non-blockchain storage systems to retrieval of data such as communication accounts. Using blockchain ledgers to perform critical computations associated with dynamic communication is likely to improve the speed and/or reliability of such communications because blockchain networks are likely to be stored in a distributed manner and with replication to reduce access latency and/or increase access availability. Accordingly, the techniques described herein may enable faster and more reliable processing of dynamic communications by leveraging the inherent performance benefits of decentralized blockchain data storage and transmission.

Figure 2:
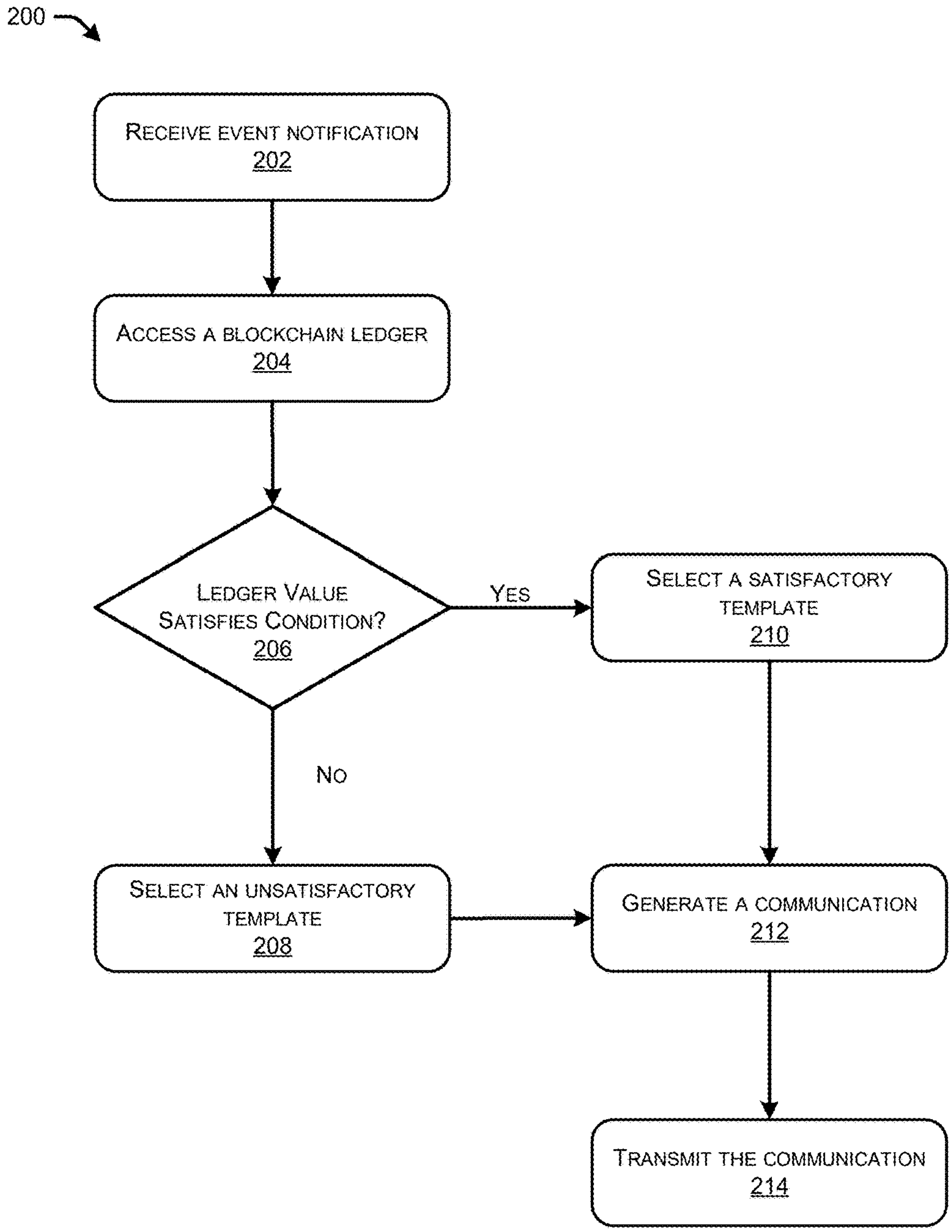
FIG. 2 is a flowchart diagram of an example process for dynamic communication using a smart contract routine that performs computations based on data stored on a blockchain ledger.

FIG. 2 is a flowchart diagram of an example process 200 for dynamic communication using a smart contract routine that performs computations based on data stored on a blockchain ledger. As depicted in FIG. 2, at operation 202, the smart contract engine 108 receives an event notification from the periodic trigger system 116. The periodic trigger system 116 may be configured to provide scheduled event notifications that trigger the execution of smart contract routines. For example, the periodic trigger system 116 may provide a notification to the smart contract engine 108 at the start of each month. Upon receiving this monthly notification, the smart contract engine 108 may initiate processing to execute operations associated with one or more smart contract routines. Accordingly, each event notification received from the periodic trigger system 116 may be associated with (e.g., may be configured to trigger) a set of smart contract routines.

At operation 204, the smart contract engine 108 accesses a blockchain ledger stored on the blockchain network 118. The blockchain network 118 may enable decentralized and replicated storage of blockchain ledgers. Each ledger may include data fields like an account balance and/or one or more communication account identifiers associated with a registered account. To execute operations associated with a smart contract routine, the smart contract engine 108 may retrieve a set of blockchain ledgers containing the data fields needed to perform computations (e.g., apply conditions) associated with the smart contract routine. For example, if the smart contract routine is associated with conditional transmission of communications based on account balance values stored on blockchain ledgers, the smart contract engine 108 would obtain the ledger storing the account balance value for the relevant registered account.

At operation 206, the smart contract engine 108 determines whether a value stored on the ledger satisfies a condition associated with the smart contract routine. The smart contract routine may be configured to determine whether ledger values stored on the blockchain ledger satisfy one or more patterns associated with one or more conditions. For example, a smart contract routine may determine whether an account balance value stored in a blockchain ledger exceeds a predefined threshold.

If the smart contract engine 108 determines that the value stored on the ledger fails to satisfy the condition associated with the smart contract routine (operation 206—No), the smart contract engine 108 proceeds to operation 208 to select an unsatisfactory communication template from the communication templates database 120. The unsatisfactory communication template may include static text data representing that a condition associated with the smart contract routine has not been satisfied by the retrieved blockchain ledger.

If the smart contract engine 108 determines that the value stored on the ledger satisfies the condition associated with the smart contract routine (operation 206—Yes), the smart contract engine 108 proceeds to operation 210 to select a satisfactory communication template from the communication templates database 120. The satisfactory communication template may include static text data representing that a condition associated with the smart contract routine has been satisfied by the retrieved blockchain ledger.

At operation 212, the smart contract engine 108 generates a communication based on the selected communication template and data stored on the ledger. In some cases, the smart contract engine 108 inserts data corresponding to one or more dynamic fields of the communication template into the communication template to generate the communication. For example, in some cases, one or more fields like an account holder's name, an account balance, and/or an account number are extracted from the ledger and integrated into the selected communication template to generate the communication.

At operation 214, the smart contract engine 108 transmits the generated communication to a client system 112 using the communication system 114. The communication system 114 may enable sending the communication to an external communication account associated with the registered account, like an email address determined based on data stored in the ledger. For example, the smart contract engine 108 may retrieve a hashed communication account from the blockchain ledger, using the hashed communication account as a retrieval key to retrieve an un-hashed communication account from the backend system 110, and transmit the generated communication to the un-hashed communication account by using the communication system 114.

Accordingly, via the operations of the process 200, the smart contract engine 108 can generate a communication based on determining whether data stored in a blockchain ledger satisfies a condition associated with a triggered smart contract routine. After generating the communication, the smart contract engine 108 can use a hashed communication account stored on the ledger as a retrieval key to retrieve an un-hashed communication account from the backend system 110 and transmit the generated communication to the un-hashed communication account by using the communication system 114. Accordingly, the process 200 may enable the smart contract engine 108 to determine parameters for generation and/or transmission of a communication (e.g., an email notification) to a client system 112 based on data stored on a publicly accessible ledger and without the need to perform any cryptographic operations and/or operations configured to transmit a private key.

Figure 3:
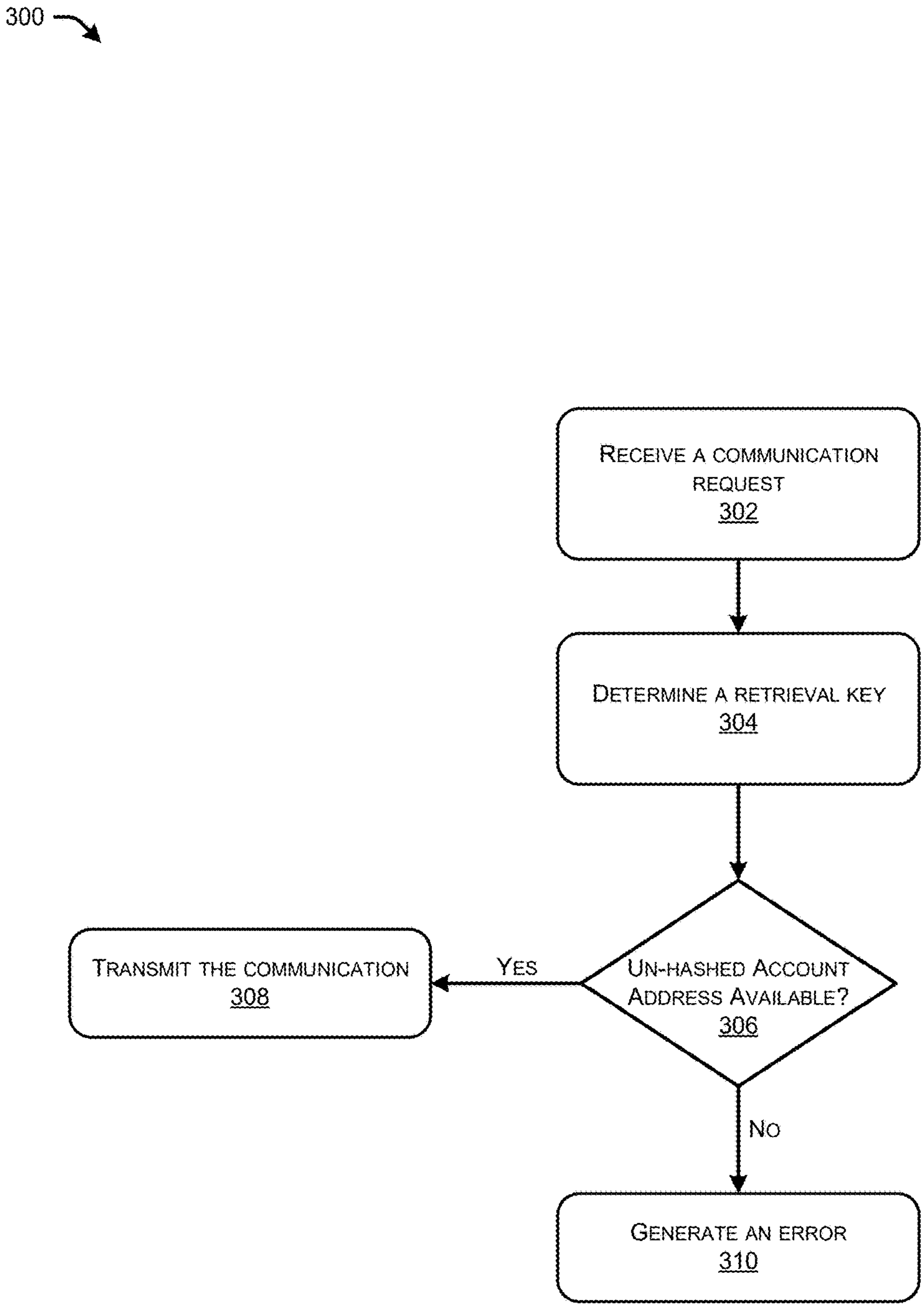
FIG. 3 is a flowchart diagram of an example process for determining a target communication account based on data stored on a blockchain ledger.

FIG. 3 is a flowchart diagram of an example process 300 for determining a target communication account based on data stored on a blockchain ledger. As depicted in FIG. 3, at operation 302, the smart contract engine 108 receives a communication request associated with a database ledger. The communication request may be a request to transmit a generated communication to a communication account associated with the database ledger.

At operation 304, the smart contract engine 108 determines a retrieval key associated with the database ledger. In some cases, the retrieval key is determined based on a field stored by the database ledger, such as a hashed communication account stored by the database ledger. In some cases, to determine a retrieval key associated with a database ledger, the smart contract engine 108 retrieves the database ledger and identifies a communication account field and/or other retrieval key field stored in the database ledger.

At operation 306, the smart contract engine 108 determines whether the retrieval key maps to an un-hashed communication account. In some cases, the smart contract engine 108 queries a database in the backend system 110 using the retrieval key to determine whether the database includes a field and/or record corresponding to the retrieval key. The retrieval key may, for example, be an un-hashed communication account.

If the smart contract engine 108 determines that the retrieval key maps to an un-hashed communication account (operation 306—Yes), the smart contract engine 108 proceeds to operation 308 to transmit the generated communication associated with the communication request to the un-hashed communication account. The smart contract engine 108 may, for example, make an API call to an email server associated with the communication system 114.

If the smart contract engine 108 determines that the retrieval key fails to map to an un-hashed communication account (operation 306—Yes), the smart contract engine 108 proceeds to operation 310 to throw an error. The error may indicate that a blockchain ledger is not associated with a communication account. The error may be logged in the backend system 110 for inspection by a system administrator.

Accordingly, via the operations of the process 300, the smart contract engine 108 may use a blockchain ledger to store data that can be used to retrieve an un-hashed communication account without performing any cryptographic decryption and/or decoding operations. To do so, the smart contract engine 108 may use a value stored on the blockchain ledger (e.g., a hashed value) as a retrieval key for querying the un-hashed communication account. Accordingly, the smart contract engine 108 can determine an un-hashed communication account by performing two retrieval operations: retrieval of a key value from the ledger and retrieval of the account from the backend system 110 based on the retrieved key. Therefore, the smart contract engine 108 may transmit a communication (e.g., an email notification) to a client system 112 based on data stored on a publicly accessible ledger and without the need to perform any cryptographic operations and/or operations configured to transmit a private key.

Figure 4:
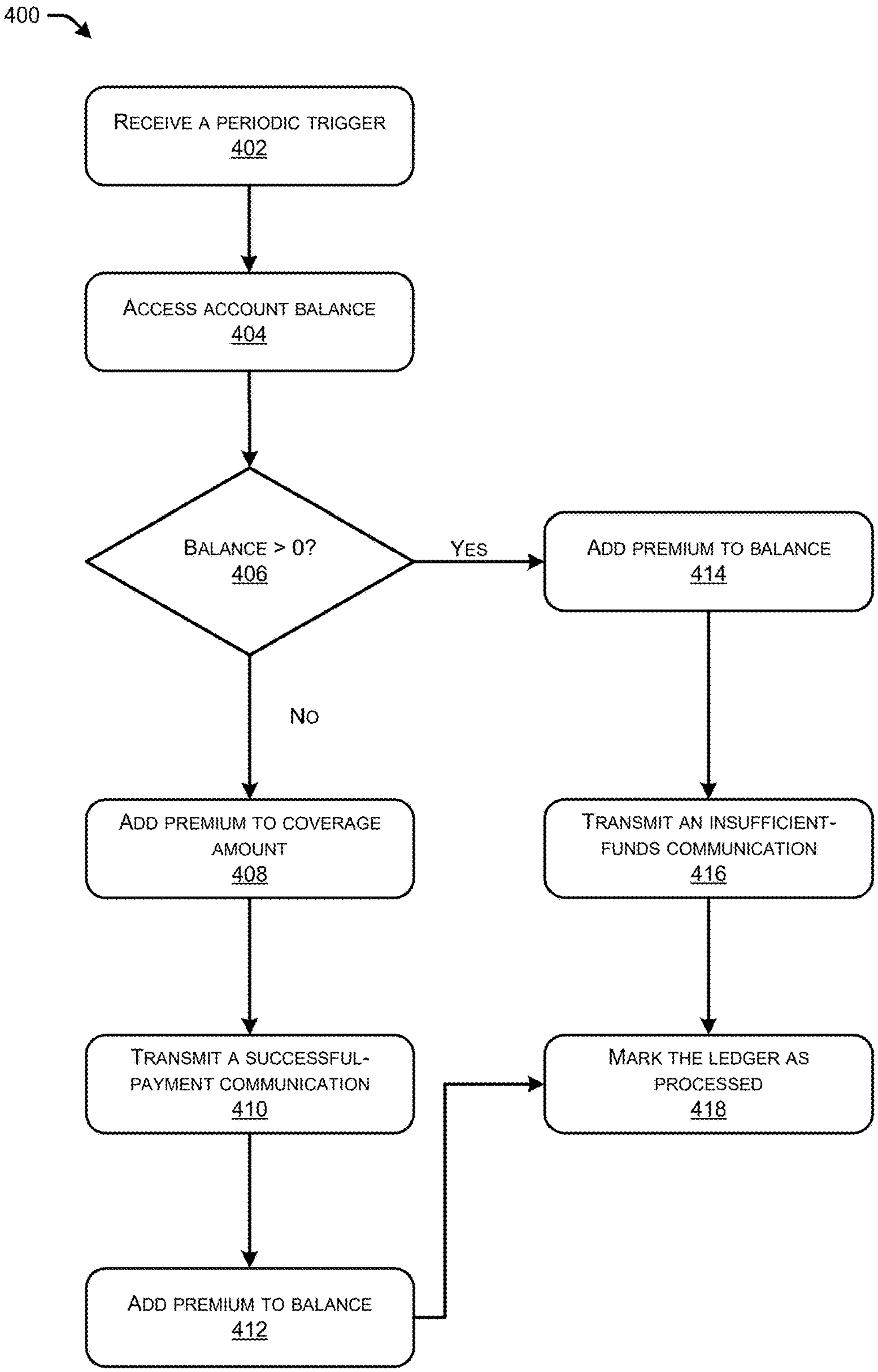
FIG. 4 is a flowchart diagram of an example process for performing periodic premium payment checks based on data stored on a blockchain ledger.

FIG. 4 is a flowchart diagram of an example process 400 for performing periodic premium payment checks based on data stored on a blockchain ledger. As depicted in FIG. 4, at operation 402, the smart contract engine 108 receives an event notification from the periodic trigger system 116. The periodic trigger system 116 may be configured to provide scheduled event notifications that trigger the execution of smart contract routines. For example, the periodic trigger system 116 may provide a notification to the smart contract engine 108 at the start of each month. Upon receiving this monthly notification, the smart contract engine 108 may initiate processing to execute operations associated with one or more smart contract routines. Accordingly, each event notification received from the periodic trigger system 116 may be associated with (e.g., may be configured to trigger) a set of smart contract routines.

At operation 404, the smart contract engine 108 accesses an account balance value associated with a blockchain ledger. In some cases, the smart contract engine 108 retrieves a blockchain ledger and determines the account balance value associated with that ledger. In some cases, the smart contract engine 108 performs operations 404-414 with respect to each ledger in a set of blockchain ledgers (e.g., all of the ledgers stored on the blockchain network 118). Accordingly, in some cases, the smart contract engine 108 may retrieve a set of (e.g., all of) the blockchain ledgers stored on the blockchain network 118.

At operation 406, the smart contract engine 108 determines whether the account balance value exceeds zero. If the account balance value does not exceed zero (operation 406—No), the smart contract engine 108 proceeds to operation 408 to add a premium amount associated with the ledger to a coverage amount value stored on the blockchain ledger. The premium amount may be a value stored on the blockchain ledger and/or on the backend system 110. Afterward, at operation 410, the smart contract engine 108 transmits a successful-payment communication to a communication account associated with the ledger (e.g., a communication account determined by querying the backend system 110 based on a retrieval key determined based on data stored on the ledger). The successful-payment communication may indicate that a premium amount associated with the ledger (e.g., with a corresponding policy associated with the ledger) has been successfully paid. Afterward, at operation 412, the smart contract engine 108 adds the premium amount to the account balance value associated with the ledger. Accordingly, after operations 408-412, the coverage amount may be updated by adding the premium amount and the account balance value may be updated by adding the premium amount. This may both increase the coverage amount associated with the policy in light of the successful premium payment and set the account balance for the subsequent period (e.g., next month).

If the account balance value exceeds zero (operation 406—No), the smart contract engine 108 proceeds to operation 414 to add a premium amount associated with the ledger to the account balance value stored on the blockchain ledger. This may reflect that the policy now owes both the preexisting debt and the newly-added premium amount. Afterward, at operation 416, the smart contract engine 108 transmits an unsuccessful-payment communication to a communication account associated with the ledger (e.g., a communication account determined by querying the backend system 110 based on a retrieval key determined based on data stored on the ledger). The unsuccessful-payment communication may indicate that a premium amount associated with the ledger (e.g., with a corresponding policy associated with the ledger) has not been successfully paid.

At operation 418, the smart contract engine 108 marks the ledger as processed. This may be configured to prevent processing of the ledger during this period (e.g., until a subsequent event notification is received from the periodic trigger system 116). By marking ledgers as processed, the system may avoid redundant processing of the same ledgers before the next scheduled trigger event. For example, the routine may execute on the first day of every month when triggered. Marking ledgers as processed until the next month may prevent reprocessing prior to the next trigger.

Accordingly, via the operations of the process 400, the smart contract engine 108 can periodically check account balance values stored on blockchain ledgers to determine whether premium payment amounts have been successfully paid. If the account balance exceeds zero, indicating an unpaid premium amount, the smart contract engine 108 can add the premium amount to the account balance and send a notification indicating unsuccessful payment. If the account balance does not exceed zero, indicating successful payment of the premium amount, the smart contract engine 108 can add the premium amount to the coverage amount, send a notification indicating successful payment, and reset the account balance by adding the premium amount. This allows the smart contract engine 108 to automatically perform periodic premium payment validations and updates based on data stored on blockchain ledgers, without needing to perform decryption or transmit private keys. In some cases, the process 400 uses the immutable and transparent nature of blockchain data storage to enable automated workflows related to checking insurance policy premiums.

Figure 5:
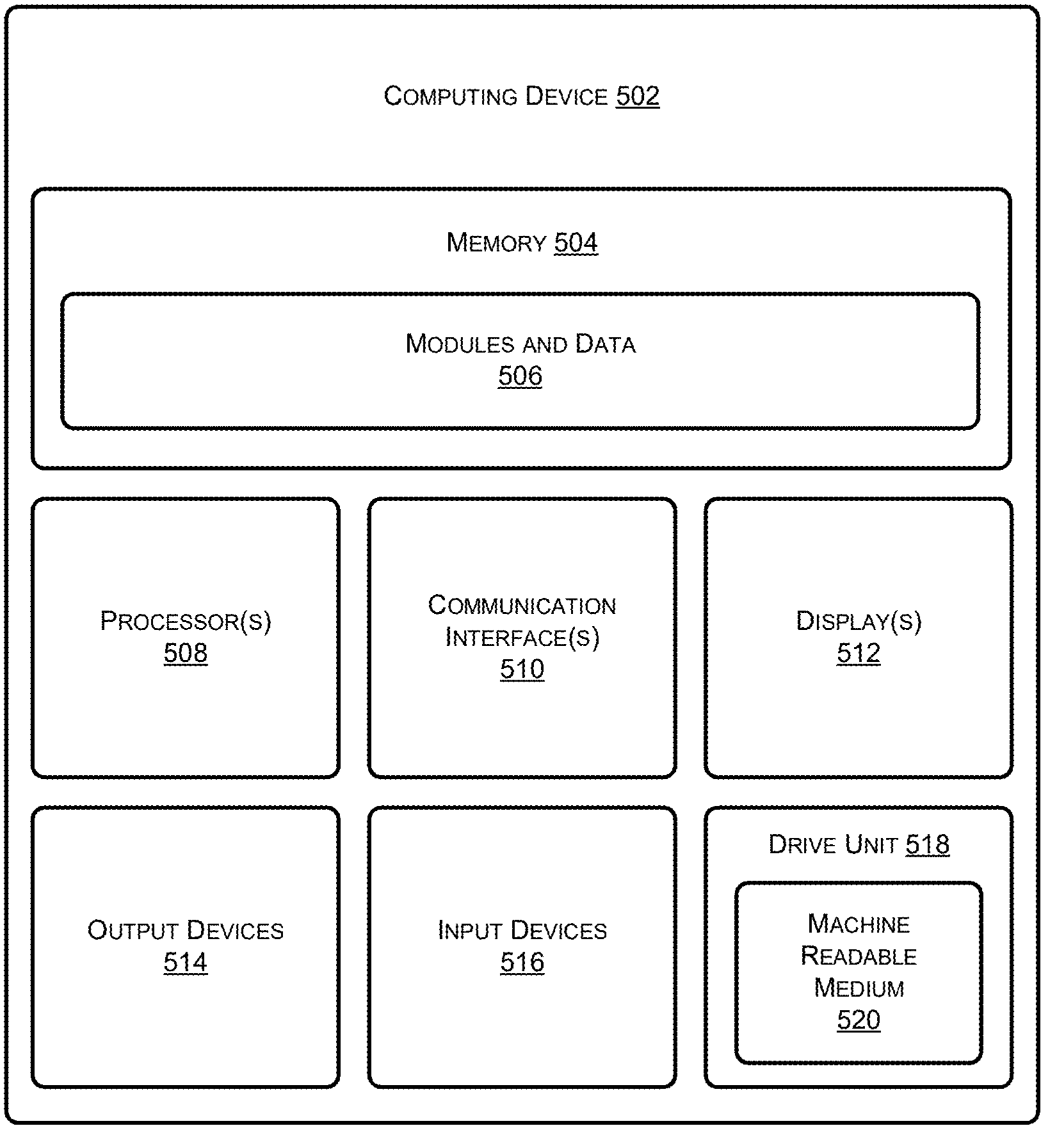
FIG. 5 shows an example system architecture for a computing device associated with the environment described herein.

FIG. 5 shows an example system architecture for a computing device 502 associated with the environment 100 described herein. A computing device 502 can be a server, computer, or other type of computing device that executes at least a portion of the environment 100. In some examples, elements of the environment 100 can be distributed among, and/or be executed by, multiple computing devices 502.

A computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 502 associated with the environment 100. Any such non-transitory computer-readable media may be part of the computing devices 502. The memory 504 can include modules and data 506 needed to perform operations of one or more computing devices 502 of the environment 100.

One or more computing devices 502 of the environment 100 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen, and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions (e.g., a set of computer-executable instructions), such as software or firmware, that embodies any one or more of the methodologies or functions described herein. The instructions can also reside, completely or at least partially, within the memory 504, processor(s) 508, and/or communication interface(s) 510 during execution thereof by the one or more computing devices 502 of the environment 100. The memory 504 and the processor(s) 508 also can constitute machine readable media 520. The instructions may cause the processor(s) 508 to perform operations described in this document.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:

receiving, by a processor, a first event notification, wherein the first event notification is generated by a periodic trigger system based on detecting that a periodic condition is satisfied; and based on receiving the first event notification, executing, by the processor, an automated routine characterized by a first condition, wherein the automated routine is configured to:

access a first distributed record, wherein the first distributed record represents a first value and a first communication account;

determine that the first value satisfies the first condition, based on determining that the first value satisfies the first condition, select a first communication template, determine a first communication based on the first communication template and the first value, and subsequent to determining the first communication, transmit the first communication to the first communication account.

2. The method of claim 1, wherein the first condition represents a threshold value.

3. The method of claim 1, wherein the first communication account is a hashed communication account, and transmitting the first communication comprises:

retrieving, from a backend system and based on the hashed communication account, an un-hashed communication account; and transmitting the first communication to the un-hashed communication account.

4. The method of claim 1, wherein the automated routine is further configured to:

based on determining that the first value satisfies the first condition, update a coverage amount stored on the first distributed record.

5. The method of claim 4, wherein the automated routine is further configured to:

subsequent to updating the coverage amount:

retrieve a public key associated with an account corresponding to the first distributed record;

sign a transfer request using the public key, and provide the transfer request to an application programming interface (API) associated with the account.

6. The method of claim 1, further comprising:

access a second distributed record, wherein the second distributed record represents a second value and a second communication account;

determine that the second value fails to satisfy the first condition, based on determining that the second value fails to satisfy the first condition, select a second communication template, determine a second communication based on the second communication template and the second value, and subsequent to determining the second communication, transmit the second communication to the second communication account.

7. The method of claim 6, wherein the automated routine is further configured to:

based on determining that the second value fails to satisfy the first condition, refrain from updating a coverage amount stored on the second distributed record.

8. The method of claim 6, wherein the automated routine is configured to, subsequent to transmitting the first communication and the second communication, update a database to represent that the first communication and second communication were transmitted.

9. The method of claim 1, wherein the periodic trigger system communicates with the automated routine using a blockchain oracle function.

10. The method of claim 1, wherein the automated routine is configured to, subsequent to transmitting the first communication, update a database to represent that the first communication was transmitted.

11. The method of claim 1, wherein the first communication template is stored on a backend database and in association with satisfaction of the first condition, and the method further comprises:

receiving, by the processor, a request to update the first communication template with a third communication template;

determining, by the processor, that the request comprises a valid digital signature; and based on determining that the request comprises the valid digital signature, storing the third communication template on the backend database and in association with satisfaction of the first condition.

12. The method of claim 11, wherein the first distributed record is stored on a decentralized storage framework while the backend database is stored on a centralized storage framework.

13. A computing system, comprising:

a processor; and memory storing computer-executable instructions that, when executed by the processor, cause the computing system to perform operations comprising:

receiving a first event notification, wherein the first event notification is generated by a periodic trigger system based on detecting that a periodic condition is satisfied; and based on receiving the first event notification, executing an automated routine characterized by a first condition, wherein the automated routine is configured to:

access a first distributed record, wherein the first distributed record represents a first value and a first communication account;

determine that the first value satisfies the first condition, based on determining that the first value satisfies the first condition, select a first communication template, determine a first communication based on the first communication template and the first value, and subsequent to determining the first communication, transmit the first communication to the first communication account.

14. The computing system of claim 13, wherein the first condition represents a threshold value.

15. The computing system of claim 13, wherein the first communication account is a hashed communication account, and transmitting the first communication comprises:

retrieving, from a backend system and based on the hashed communication account, an un-hashed communication account; and transmitting the first communication to the un-hashed communication account.

16. The computing system of claim 13, wherein the automated routine is further configured to:

based on determining that the first value satisfies the first condition, update a coverage amount stored on the first distributed record.

17. One or more non-transitory computer-readable media storing computer-executable instructions that, when executed by a processor, cause the processor to perform operations, comprising:

receiving a first event notification, wherein the first event notification is generated by a periodic trigger system based on detecting that a periodic condition is satisfied; and based on receiving the first event notification, executing an automated routine characterized by a first condition, wherein the automated routine is configured to:

access a first distributed record, wherein the first distributed record represents a first value and a first communication account;

determine that the first value satisfies the first condition, based on determining that the first value satisfies the first condition, select a first communication template, determine a first communication based on the first communication template and the first value, and subsequent to determining the first communication, transmit the first communication to the first communication account.

18. The one or more non-transitory computer-readable media of claim 17, wherein the first condition represents a threshold value.

19. The one or more non-transitory computer-readable media of claim 17, wherein the first communication account is a hashed communication account, and transmitting the first communication comprises:

retrieving, from a backend system and based on the hashed communication account, an un-hashed communication account; and transmitting the first communication to the un-hashed communication account.

20. The one or more non-transitory computer-readable media of claim 17, wherein the automated routine is further configured to:

based on determining that the first value satisfies the first condition, update a coverage amount stored on the first distributed record.

* * * * *